United States Patent
Henrici et al.

(10) Patent No.: US 9,793,581 B2
(45) Date of Patent: Oct. 17, 2017

(54) ENCASING FILM FOR A GALVANIC ELEMENT, ELECTROCHEMICAL STORE, ELECTROCHEMICAL STORAGE SYSTEM, FLEXIBLE FILM FOR AN ENCASING OF A GALVANIC ELEMENT, AND METHOD FOR DETERMINING A STATE VARIABLE OF AN ELECTROCHEMICAL STORE

(71) Applicant: Robert Bosch GmbH, Stuttgart (DE)

(72) Inventors: Fabian Henrici, Stuttgart (DE); Remigius Has, Grafenau-Daetzingen (DE); Jens Schneider, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 400 days.

(21) Appl. No.: 14/400,618

(22) PCT Filed: Apr. 8, 2013

(86) PCT No.: PCT/EP2013/057305
§ 371 (c)(1),
(2) Date: Nov. 12, 2014

(87) PCT Pub. No.: WO2013/171003
PCT Pub. Date: Nov. 21, 2013

(65) Prior Publication Data
US 2015/0132621 A1    May 14, 2015

(30) Foreign Application Priority Data

May 14, 2012    (DE) .......................... 10 2012 207 999

(51) Int. Cl.
*G01L 1/10*    (2006.01)
*H01M 10/48*    (2006.01)
(Continued)

(52) U.S. Cl.
CPC ......... *H01M 10/482* (2013.01); *G01L 9/0001* (2013.01); *H01M 2/0275* (2013.01);
(Continued)

(58) Field of Classification Search
CPC .. H01M 10/48; H01M 10/058; H01M 10/482; H01M 4/131; H01M 4/134;
(Continued)

(56) References Cited

U.S. PATENT DOCUMENTS

| 2005/0084754 A1* | 4/2005 | Klein ................... H01M 2/345 |
| | | 429/210 |
| 2006/0093896 A1 | 5/2006 | Hong et al. |
| 2007/0054157 A1 | 3/2007 | Ryu et al. |

FOREIGN PATENT DOCUMENTS

| DE | 102009058783 A1 * | 6/2011 | ............ H01M 10/48 |
| DE | 10 2010 043710 | 5/2012 | |

(Continued)

OTHER PUBLICATIONS

International Search Report for PCT/EP2013/057305, dated Oct. 10, 2013.

*Primary Examiner* — Harshad R Patel
*Assistant Examiner* — Brandi Hopkins
(74) *Attorney, Agent, or Firm* — Norton Rose Fulbright US LLP; Gerard Messina (57) ABSTRACT

An encasing film for a galvanic element has at least one force sensor for detecting an expansion state of the encasing film. The encasing film is produced from an elastic and electrically insulating material, e.g., plastic. The force sensor, which has a strain gauge, is situated on a surface of the encasing film.

10 Claims, 6 Drawing Sheets

(51) Int. Cl.
*H01M 2/02*     (2006.01)
*H01M 2/10*     (2006.01)
*H01M 10/42*    (2006.01)
*G01L 9/00*     (2006.01)
*H01M 2/12*     (2006.01)
*H01M 2/34*     (2006.01)
*H01M 10/44*    (2006.01)

(52) U.S. Cl.
CPC ..... *H01M 2/1077* (2013.01); *H01M 10/4257* (2013.01); *H01M 10/48* (2013.01); *H01M 10/486* (2013.01); *H01M 2/1241* (2013.01); *H01M 2/34* (2013.01); *H01M 2/345* (2013.01); *H01M 2/348* (2013.01); *H01M 10/445* (2013.01); *H01M 2200/20* (2013.01)

(58) Field of Classification Search
CPC ........... H01M 10/0525; H01M 10/052; H01M 2/0207; H01M 2/0212; H01M 2/0237; H01M 2/0262; H01M 2/06; H01M 2/305; H01M 2/34; H01M 2/345; H01M 2/348; H01M 10/486; H01M 2/0275; H01M 2/0287; Y02T 10/7011
USPC ...... 73/862.625; 429/7, 61, 178, 90, 66, 176
See application file for complete search history.

(56) References Cited

FOREIGN PATENT DOCUMENTS

| JP | 2000 340264 | | 12/2000 | |
|----|-------------|---|---------|---|
| JP | 2010086911 | A | 4/2010 | |
| JP | 2011249015 | A | 12/2011 | |
| WO | WO2011072989 A1 * | | 6/2011 | ............ H01M 10/48 |

* cited by examiner

ENCASING FILM FOR A GALVANIC ELEMENT, ELECTROCHEMICAL STORE, ELECTROCHEMICAL STORAGE SYSTEM, FLEXIBLE FILM FOR AN ENCASING OF A GALVANIC ELEMENT, AND METHOD FOR DETERMINING A STATE VARIABLE OF AN ELECTROCHEMICAL STORE

BACKGROUND OF THE INVENTION

1. Field of the Invention

The present invention relates to an encasing film for a galvanic element, an electrochemical store, an electrochemical storage system, a flexible film for an encasing of a galvanic element, and a method for determining a state variable of an electrochemical store.

2. Description of the Related Art

With greater and greater demand for alternative drive concepts, the electric drive is increasingly becoming the focus of consideration. For this purpose, lithium-ion batteries are developing into the key technology for modern automobile drives. Lithium-ion cells exist in various structural forms or cell types. One particular specific embodiment is formed here by so-called pouch cells or coffee bag cells. As is already obvious from the name, pouch cells are not dimensionally stable; the cell winding thereof is welded into a flexible "film bag."

The flexible housing used represents several system-related challenges, however. The sealing seam of the cells must thus be leak-tight over the entire service life of the battery. This is made more difficult because the cells "breathe" during the cycling, i.e., their thickness varies as a function of the state of charge. In addition, a changing pressure difference exists between the cell interior and surroundings as a result of air pressure variations and the respiration of the cell. Furthermore, aging processes, which are expressed in degassing, for example, may result in inflation of the pouch cell. The significant weight advantage, the possible stacking, which is spatially very efficient, and the large aspect ratio, whereby heat may be dissipated outward very well, are thus to be considered to be safety-critical because of the possible inflation of the cell in the event of gas development. The sealing seams of the cell may thus open nonspecifically in the event of malfunctions and overpressure resulting therefrom in the cell interior. In the worst case, combustible gases such as electrolyte or decomposition products may reach the outside, which may result in fires or explosions under certain circumstances. To monitor this safety-critical state, sensors for pouch cells are of great significance.

BRIEF SUMMARY OF THE INVENTION

Against this background, the present invention provides an encasing film for a galvanic element, an electrochemical store, an electrochemical storage system, a flexible film for an encasing of a galvanic element, and a method for determining a state variable of an electrochemical store.

A film is provided which is functionalized for a meteorological detection of a physical variable of a pouch cell, for example, a mechanical tension, a gas pressure, a cell temperature, etc. For this purpose, the film may be designed as a sensor, in particular a force sensor, or may have a sensor and may form a part of an encasing of the pouch cell or may be applicable to an outer side or inner side of the encasing of the pouch cell. One or more of the detected measured variables may be used in a corresponding method according to the present invention, for example, for a calculation of the state of charge (SOC) and/or a state of health (SOH) of the cell, and optionally additionally for a safety-relevant check of a hermetic seal (leak-tightness) of the cell.

By detecting the pressure conditions or mechanical deformation of the relatively sensitive pouch cell, a direct statement is possible about the state of charge of the battery, its state of health, and about a presence of a defect, for example, extreme pressure increase or deformation, or leaks. Thus, for example, in regard to the occupant protection, a replacement of pouch cells is possible at any time, for example, when a specific gas pressure in the cell is exceeded. With the approach provided here, the internal pressure measurement or gas pressure measurement of the pouch cell may also be read out in the uninstalled state of the battery, whereby safer recycling of the cells may be made possible. The detection, which is implementable according to the concept provided here, of the mechanical deformation of the cell on the outer side, has the additional advantage that the sensor is not exposed to the electrolyte and therefore does not have to be separately protected. In this way, the packaging of this sensor may be significantly simplified. Furthermore, the sensor and its supply lines may be integrated directly in a manufacturing process of the pouch cells. The sensor or force sensor according to the present invention is distinguished by a very small installation height and therefore does not obstruct the sequence of the cell chemistry in the pouch cell or the deformation of the external encasing. Since the supply lines may also be printed on, the sensor in this special specific embodiment does not require an additional bonding process, as is the case in conventional sensors. Because of the detection of the pressure conditions, rapid charging and discharging of the battery cells, which may be monitored, is also possible.

If the force sensor is used as a gas pressure sensor in the case of the encasing film provided here, a possible opening of the pouch cell—i.e., damage with gas pressure loss—may also be detected as a result of a delamination, for example.

Advantageously, efficient and extremely cost-effective measurement of mechanical tensions, pressures, or forces, the pH value, a half-cell voltage, and/or temperature influences in or on pouch cells is enabled by functionalizing already existing layers, introducing additional functionalized films, or printing the inner or outer encasing of the pouch cell. The measurement may be achieved via the force sensor, which may have a strain gauge, for example. In the case of the temperature measurement in the pouch cell, for a more precise measurement result, measurements may be performed locally or multiple measurements may be performed using a divided film array in the cell. An encasing film for a galvanic element is characterized in that the encasing film has at least one force sensor for detecting a strain state of the encasing film.

The encasing film may be produced from an elastic and electrically insulating material, for example, from a suitable plastic. The encasing film may be designed, for example, as a rectangular bag, which is open on one side for the insertion of the galvanic element into the encasing film. After the insertion of the galvanic element, the open side of the bag may be closed in such a way that the galvanic element is enclosed fluid-tight, in particular gas-tight, by the encasing film. A force sensor may be understood as a force pickup or a measuring unit for detecting expanding deformations. The force sensor may be elastically deformable like the encasing film and may be designed, for example, to detect a tensile force exerted on a measurement area of the force sensor. The force sensor may be fixedly connected to at least one partial area of the encasing film. Because of the fixed connection, the force sensor may also expand with an expansion of the encasing film, so that based on the detected tensile force on the force sensor, which is linked to the expansion, a degree of the expansion and therefore an expansion state of the encasing film may be inferred. The expansion of the encasing film may be attributed to chemical and/or physical processes in an electrolyte of the galvanic element enclosed by the encasing film. For example, an intercalation of the lithium in the electrodes may result in an expansion and a state of charge of the galvanic element may be determined accordingly with the aid of SOC detection, or gas development may occur in the electrolyte as a result of aging processes, whereby the encasing film inflates and expands, since the gases may not escape outward because of the fluid-tightness of the encasing film.

According to one specific embodiment, the force sensor may have a strain gauge. The strain gauge may be distinguished in that it already changes its electrical resistance in the event of slight deformations. An expansion of the encasing film may thus advantageously be detected with low cost outlay and particularly rapidly and reliably.

In particular, the force sensor may be situated on a surface of the encasing film. The force sensor may be located on an outer side or on an inner side of the bag formed by the encasing film for the galvanic element. The position of the force sensor may thus be adapted in a simple way to specification requirements. The force sensor may thus be protected from damage, for example, by an arrangement on the inner side of the encasing film. In contrast, with the arrangement on the outer side, a contact of the sensor with the electrolyte may be avoided and therefore possible ignition of the electrolyte may be prevented. The fact that only materials may be introduced into the cell which do not influence the cell chemistry does not have to be taken into account here, which has the advantage of freer material selection.

According to one specific embodiment, the force sensor may be situated in a middle area of the encasing film. The term "middle area" means in this case the middle area of the top view surface, i.e., the surface having the largest extension, the force sensor not necessarily being situated on the encasing film, but rather also being able to be situated in a perpendicular direction thereto in the interior. Alternatively or additionally, a further force sensor may be situated in an edge area of the encasing film. Edge area means in this case the area enclosing the middle area of the encasing film viewed from above. The edge area may be designed as a feedthrough area for at least one electrical contact of a galvanic element. Relevant items of information about various states of the galvanic element may thus be obtained in a simple way, specifically by suitable placement of the force sensor or further force sensor. If the galvanic element is, for example, part of a battery pack having galvanic elements lying closely against one another, with the arrangement of the force sensor in the middle area of the main side of the encasing film, so-called respiration of the cell and therefore an alternately occurring expansion and relaxation of the encasing film may thus be detected, which enables inferences about a state of charge of the galvanic element. In contrast, the arrangement of the further force sensor in the edge area, for example, close to the insertion opening of the bag formed by the encasing film, enables a measurement of a state of aging or state of health of the galvanic element, since here, where the pressure of adjacent cells does not have an effect on the encasing film, a detected expansion may indicate aging-related degassing processes of the electrolyte. Therefore, using identical sensors, which are only situated at different points of the encasing film enclosing the galvanic element, different states of the galvanic element may be monitored.

Furthermore, the encasing film may have an intended breakpoint, an electrical contact for an electrical connection of the force sensor being able to be situated in an area of the intended breakpoint. Depending on the arrangement of the force sensor on the inner side or outer side of the encasing film, the intended breakpoint may form a feedthrough area for the electrical contact of the sensor from the inside to the outside, or the electrical contact may be led on the outside past the intended breakpoint. In both cases, bursting of the intended breakpoint caused by an expansion of the encasing film causes tearing of the contact. For example, the intended breakpoint may be situated in the area of the insertion opening for the galvanic element of the encasing film forming a bag, through which, for example, further contacts for the electrical connection of the galvanic element itself may be led. With this specific embodiment, an additional possibility opens up for detecting the state of the galvanic element in that, for example, due to the tearing of the sensor contact at the intended breakpoint, a warning signal may be output about a hazardous state of the galvanic element to a connected safety system.

An electrochemical store for converting chemical energy into electrical energy has the following features:
a galvanic element;
an encasing film according to one of the above-explained specific embodiments, the encasing film enclosing the galvanic element, and the expansion state of the encasing film representing a state variable of the galvanic element.

For the electrical connection of the galvanic element, the electrochemical store may furthermore have two contacts, one of which may be embodied as an anode and the other of which may be embodied as a cathode. The galvanic element may be a lithium-ion cell, for example. The galvanic element may be part of a so-called coffee bag cell or pouch cell, which is characterized in that it is not dimensionally stable, i.e., it has a flexible jacket with the encasing film. In this specific embodiment, the cell receives a lower weight and may be used in a more space-saving way, but requires particularly reliable defect monitoring as a result of the high stress of the encasing film, which is to be ensured using the concept provided here. The encasing film may be designed as a bag, as already explained, in which during the manufacturing process of the electrochemical store, a cell winding having the electrolytes may be inserted and the opening of which may subsequently be welded or closed fluid-tight in another way. The anode and the cathode may penetrate the encasing film at such a closure seam, for example, and thus ensure the electrical connection of the cell winding. The state variable represented by the expansion state of the encasing film may be a value for a state of charge or a value for a state of aging or health of the electrochemical store.

In the electrochemical store, an electrical contact of the galvanic element may be electrically conductively connected to an electrical terminal of the force sensor. Furthermore, a further electrical contact of the galvanic element may be electrically conductively connected to a further electrical terminal of the force sensor. The force sensor may advantageously be supplied with an operating voltage or with electrical energy in general via the contact or contacts of the galvanic element. Additionally or alternatively, information may be transmitted via the contact or contacts of the galvanic element, or information or data may be transmitted to the force sensor or may be emitted from the force sensor.

The electrochemical store may also furthermore have at least one further sensor, in particular a temperature sensor, a pH value sensor, a half-cell voltage measurement sensor, or a further force sensor. The electrical contact of the galvanic element may be electrically conductively connected to an electrical terminal of the at least one further sensor. An integration of further sensors in the electrochemical store, for example, a pouch cell, is thus possible. The at least one sensor may be powered via the cell voltage. The signal communication of the at least one sensor may take place via a power line. According to this specific embodiment, manifold measured values may be made to be detectable, so that, for example, with the aid of redundancy values, measurement results may be verified in a simple way.

An electrochemical storage system for converting chemical energy into electrical energy has the following features:

a plurality of above-explained electrochemical stores, which are situated in the form of a stack; and a frame unit for fixing a position of each of the plurality of electrochemical stores in the stack.

The electrochemical storage system may be used, for example, as a battery for driving an electric vehicle or hybrid vehicle. For this purpose, the plurality of electrochemical stores situated in a stack may be combined to form a battery pack with the aid of the frame unit. The battery pack may be designed in such a way that the individual electrochemical stores are packed closely against one another on the main sides of the particular encasing films and all contacts of the electrochemical stores protrude out of the frame unit pointing in the same direction, so that electrical voltage generated in the electrochemical storage system may be tapped there readily.

The present invention furthermore provides a flexible film for an encasing of a galvanic element, the flexible film having a force sensor. The flexible film may have the force sensor on a surface. Alternatively, the force sensor may also be welded into the flexible film. The flexible film having the force sensor may be manufactured in a separate manufacturing method, for example, and to finish an above-described encasing film, may be fastened, for example, glued at a suitable position thereon. Such a flexible film may provide additional protection for the force sensor and improve a fixed connection of the force sensor to the surface of the encasing film.

A method for determining a state variable of an electrochemical store for converting chemical energy into electrical energy, the electrochemical store having a galvanic element enclosed by an encasing film, includes the following steps:

detecting an expansion state of the encasing film; and ascertaining the state variable, based on the expansion state.

Individual or all steps of the method may be carried out, for example, by a control unit, which may be connected via a CAN bus of a vehicle to the electrochemical store. A suitable algorithm may be used to ascertain the state variable, for example. The control unit may be designed to carry out or implement the steps of the method according to the present invention in corresponding units. The object on which the present invention is based may also be achieved rapidly and efficiently by this embodiment variant of the present invention in the form of a control unit.

A control unit may be understood in the present case as an electrical device, which processes sensor signals and outputs control and/or data signals as a function thereof. The control unit may have interfaces which may be implemented in hardware and/or software. In the case of a hardware implementation, the interfaces may be part of a so-called system ASIC, for example, which contains greatly varying functions of the control unit. However, it is also possible that the interfaces are separate integrated circuits or are made at least partially of discrete components. In the case of a software implementation, the interfaces may be software modules, which are provided on a microcontroller in addition to other software modules, for example.

According to one specific embodiment of the method, in the step of detection, a first expansion state in a middle area of a main side of the encasing film may be detected and/or a second expansion state in an edge area of a main side of the encasing film may be detected. Correspondingly, in the step of ascertainment, a first state variable based on the first expansion state may be ascertained and/or a second state variable based on the second expansion state may be ascertained, the first state variable being able to represent a state of charge of the electrochemical store and the second state variable being able to represent a state of aging of the electrochemical store. Using a simultaneous state detection at different relevant positions of the electrochemical store, misinterpretations with regard to a cause of an expansion of the encasing film may be avoided. Furthermore, after a successful association of detected measured values with the particular state, suitable measures may be taken. Thus, for example, in the case of a measured value which describes a state of charge of the electrochemical store, for example, presently prevailing pressure conditions may be inferred and, for example, more rapid charging or discharging of the electrochemical store may be initiated. A force sensor used for the detection of the state of charge may be situated in the middle on a main side of the encasing film, for example, where it may detect informative expansion measured values in conjunction with the "respiration" of all cells in a battery pack. On the other hand, it may be established using a measured value which describes a state of aging or state of health of the electrochemical store, because the associated force sensor is situated in an edge area uninfluenced by the cell respiration, that the electrochemical store should be replaced during the next maintenance as a result of degassing processes.

A computer program product having program code, which may be stored on a machine-readable carrier such as a semiconductor memory, a hard drive memory, or an optical memory and may be used to carry out the method according to one of the above-described specific embodiments when the program product is executed on a computer or in a device, is also advantageous.

The present invention will be explained in greater detail hereafter as an example on the basis of the appended drawings.

DETAILED DESCRIPTION OF THE INVENTION

In the following description of preferred exemplary embodiments of the present invention, identical or similar reference numerals are used for the elements which are shown in the various figures and act similarly, a repeated description of these elements being omitted.

Figure 1A:
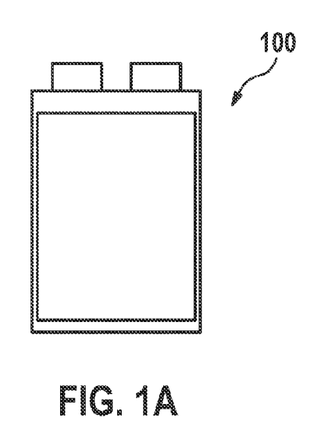
FIGS. 1A-1C show views of different embodiments of pouch cells.
Figure 1B:
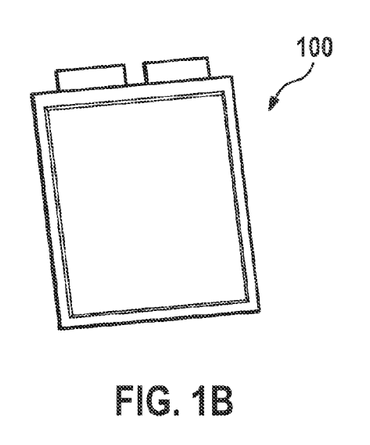
Figures 1C, 2:
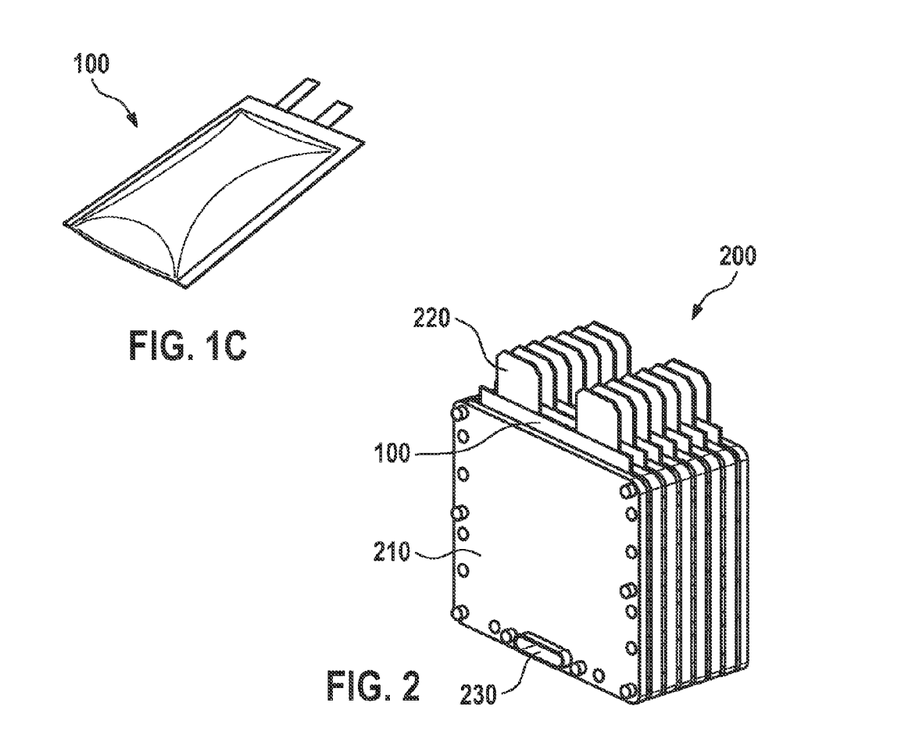
FIG. 2 shows a perspective view of an electrochemical storage system.

FIGS. 1A through 1C show illustrations of commercially-available pouch cells 100 in different specific embodiments. It is apparent from the illustrations that cells 100 are embodied as a so-called soft pack, i.e., do not have a rigid housing, but rather a flexible jacket or encasing film. FIG. 1C shows a soft pack 100 inflated from gas development. Such gas development typically occurs when aging of cell 100 has reached a critical point, and cell 100 should be deactivated before the internal gas pressure may cause bursting of the soft pack and escape of hazardous cell components.

FIG. 2 shows a perspective view of an electrochemical storage system 200. Electrochemical storage system 200 includes a plurality of electrochemical stores in the form of pouch cells 100, as are shown as examples in FIGS. 1A through 1C. Electrochemical stores or pouch cells 100 are situated in the form of a recumbent stack and are fixed in their particular position by a frame unit 210. Pouch cells 100 are enclosed by frame unit 210 in such a way that only contacts 220 for the electrical connection of electrochemical storage system 200 protrude beyond an upper edge of frame unit 210. In a base area, frame unit 210 has a discharge channel 230 for dissipating heat from electrochemical storage system 200.

Figure 3:
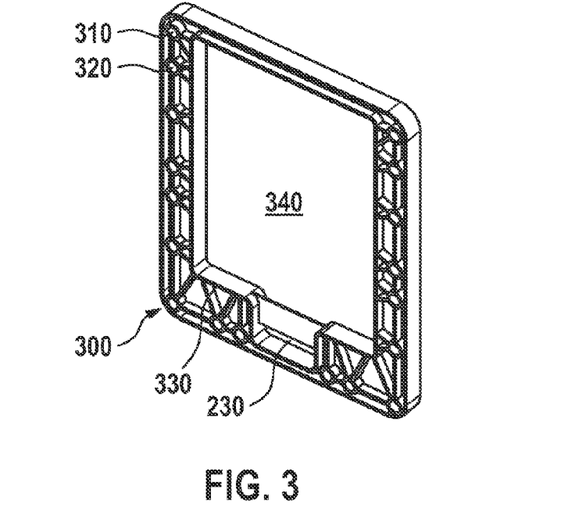
FIG. 3 shows a perspective view of a frame element of the electrochemical storage system from FIG. 2.

FIG. 3 shows, on the basis of another perspective view, a frame element 300 of the frame unit shown in FIG. 2 of the electrochemical storage system. Frame element 300 is designed to enclose a pouch cell like a sandwich together with another such frame element, a clearance of frame element 300 being sufficiently large so it does not obstruct so-called respiration of the cell caused by charging and discharging of the pouch cell. The exemplary embodiment of frame element 300 shown here is conceived as an intermediate element of the frame unit shown in FIG. 2 and includes, in addition to the opening for above-explained discharge channel 230, furthermore a screw feedthrough 310 for a connection of frame element 300 to a further frame element or a terminus plate for the frame unit, a passage opening for a cooling channel 320 for conducting a cooling fluid through the electrochemical storage system, an elastomeric seal 330 for the suitable sealing of the battery pack, and a recess 340 as a free space for an expansion of a pouch cell enclosed by frame element 300. The view of frame element 300 in FIG. 3 shows that in electrochemical storage systems conceived in this way, the individual pouch cells touch on their main surfaces and alternating pressures corresponding to a particular state of charge of individual cells exist in the entire cell stack and these pressures pass through in a force path oriented transversely to frame element 300.

Figure 4A:
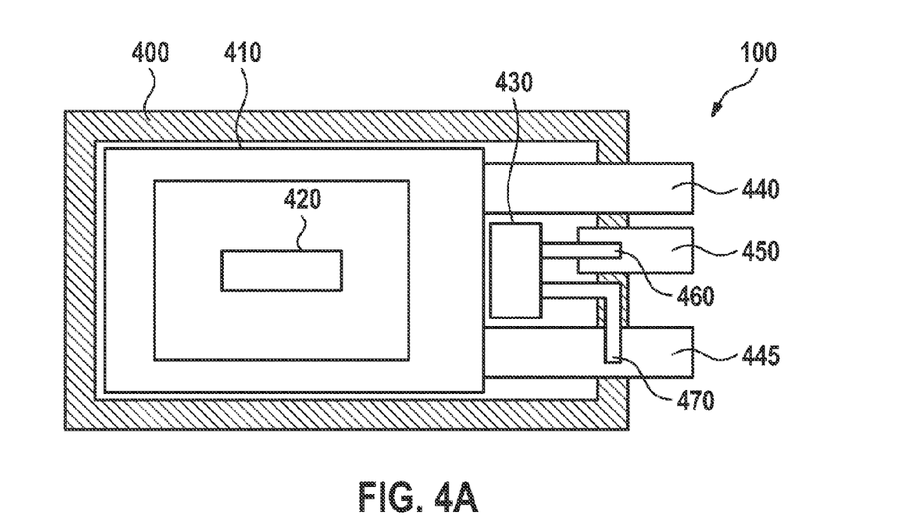
FIG. 4A shows a schematic view of an electrochemical store having an encasing film according to one exemplary embodiment of the present invention.

FIG. 4A shows a schematic view of an electrochemical store 100 according to one exemplary embodiment of the present invention. Electrochemical store 100 is embodied as a pouch cell and may be used for the electrochemical storage system shown in FIG. 2, for example. Electrochemical store 100 includes an encasing film 400, a galvanic element 410, a first film sensor or force sensor 420, a second film sensor or force sensor 430, and a first electrode 440 and a second electrode 445 for the electrical connection of galvanic element 410. In the exemplary embodiment of electrochemical store 100 shown in FIG. 4A, electrode 440, which is shown on top in the illustration, forms the cathode, and electrode 445, which is shown on the bottom in the illustration, forms the anode. As already explained, encasing film 400 encloses galvanic element 410, but is only shown as a frame enclosing galvanic element 410 for reasons of visibility here. The area of encasing film 400 visible in the figure identifies end sections of edge areas of the encasing film at the same time here. Galvanic element 410 has a cell winding for generating electrical energy from chemical energy. Furthermore, an auxiliary contact 450 for the voltage supply of second force sensor 430 is shown. For this purpose, second force sensor 430 is connected via a first terminal 460 to auxiliary contact 450 and is connected via a second terminal 470 to anode 445. The voltage supply of first force sensor 420 is not shown in the illustration in FIG. 4A. For example, it may be situated on an inner side of encasing film 400, which is not visible to the eye.

It is apparent from FIG. 4A that first force sensor 420 is situated in a middle area of encasing film 400, as explained at the outset, the term "middle area" meaning the middle area in a top view of the encasing film. In this case, the top view is the view of the area of the encasing film having the largest extension. First force sensor 420 therefore lies in the force path, which was explained in conjunction with FIG. 3, of a plurality of pouch cells 100 stacked one on top of another. First force sensor 420 measures in this case a force which results due to a volume change of cell layers (not shown in the illustration of FIG. 4A), i.e., a stack made of a plurality of pouch cells 100. The force may be detected, for example, in a capacitive, piezoresistive, or resistive way, for the resistive detection, for example, using a touchscreen, which reacts to a pressure which connects two electrically conductive layers at a point, or with the aid of a voltage divider. A measured value thus obtained enables, with suitable analysis, a determination of the SOC of electrochemical store 100. Second force sensor 430 lies outside the force path in an edge area of encasing film 400 and therefore at a point at which encasing 400 of cell 100 may expand unobstructed by other cells 100 of a stack. At this point, an influence of an internal gas pressure of pouch cell 100 may be detected, specifically via an expansion which it induces in encasing film 400. Thus, using suitable analysis of a detected measured value, a determination of the state of health of electrochemical store 100 may be carried out here. In the exemplary embodiment shown here, second force sensor 430 is printed onto encasing film 400. Alternatively, a MEMS element may also be applied for the force detection, specifically on the inner side or outer side of encasing film 400. In first force sensor 420 and second force sensor 430, the detection takes place in each case based on an expansion of a strain gauge used in the sensors.

In principle, both film sensors 420, 430 may be applied to the inner side or outer side of encasing film 400. Temperature sensing may take place separately via a film sensor, for example, locally or via an array. The sensing may be carried out resistively, for example, via a resistor which only changes via the temperature. According to specific embodiments of electrochemical store 100 which are not shown in the figures, terminals 460, 470 of first force sensor 420 or of second force sensor 430 or both force sensors 420, 430 may be led outward in the case of internal arrangement of sensors 420, 430. Alternatively, terminals 460, 470 may also be placed exclusively inside encasing film 400 of pouch cell 100 and may also be connected to a main power line of electrochemical store 100 inside pouch cell 100. Of course, terminals 460, 470 of film sensors 420, 430 which use them may also be led on or also inside pouch cell 100.

Figure 4B:
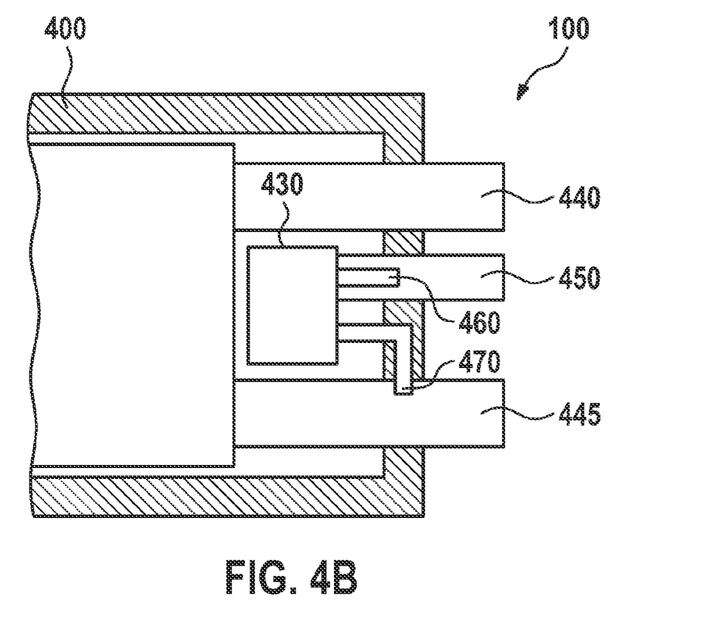
FIG. 4B shows a schematic view of a section of the electrochemical store from FIG. 4A.

FIG. 4B shows a section of an electrochemical store 100 from FIG. 4A on the basis of another schematic view. The detailed view shows a front area, which is on the right in the view in FIG. 4A, of pouch cell 100 to illustrate the contacting variants selected in this exemplary embodiment of the film sensors on the example of second force sensor 230. The view in FIG. 4B is a cross section on external encasing 400 of pouch cell 100 and shows an interior of pouch cell 100, like FIG. 4A. As already explained, force sensor 430 is connected via a first terminal 460 to auxiliary contact 450 and is connected via a second terminal 470 to anode 445. As the view in FIG. 4B shows, cathode 440, anode 445, and auxiliary contact 450 break through the edge area of encasing film 400 on one side. A seal seam or a seal frame ensures a fluid-tight closure of encasing film 400 and compresses metal contacts 440, 445, 450 and, for example, a conductive coating of an inner side of encasing 400. In this way, an electrical contact of cell 100 and sensor 430 may be achieved with a fluid-tight seal. In the event of a crack or another failure of the weld seam in the area of the film welded connection, for example, because of strong degassing in electrical element 410, one or all of electrical contacts 440, 445, 450 will disconnect. A signal thus triggered may indicate, for example, to a battery management system, a cell defect. Alternatively, this functionality may also be provided at any arbitrary other point of electrochemical store 100. Contacts 440, 445, 450 are printed here on the internal surface of encasing film 400. Contacts 440, 445, 450 extend beyond an edge of encasing film 400.

Figure 5:
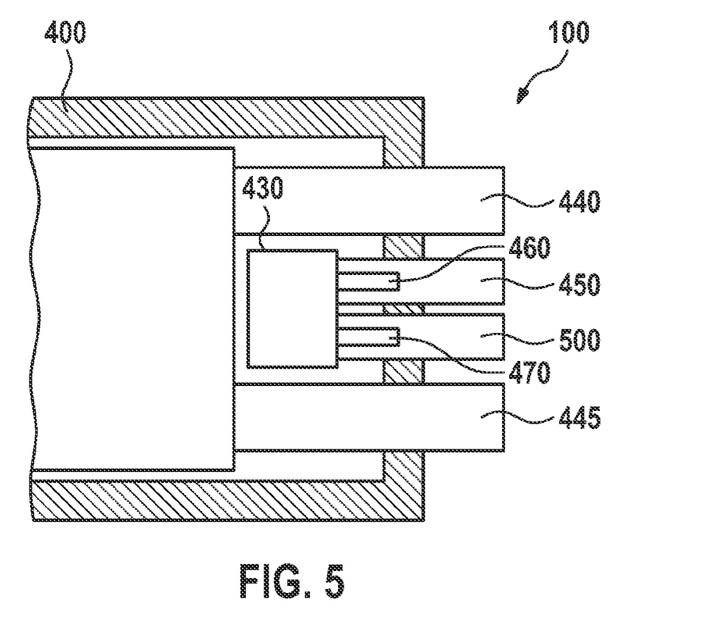
FIG. 5 shows a schematic view of a section of an electrochemical store having an encasing film according to another exemplary embodiment of the present invention.

FIG. 5 shows a further contacting possibility of second sensor 430 on the basis of another schematic view of the section of electrochemical store 100 from FIG. 4B. In addition to auxiliary contact 450, a further auxiliary contact 500 is used here. In contrast to the exemplary embodiment of pouch cell 100 shown in FIG. 4B, second terminal 470 does not connect sensor 430 to anode 445, but rather to further auxiliary contact 500.

Figure 6:
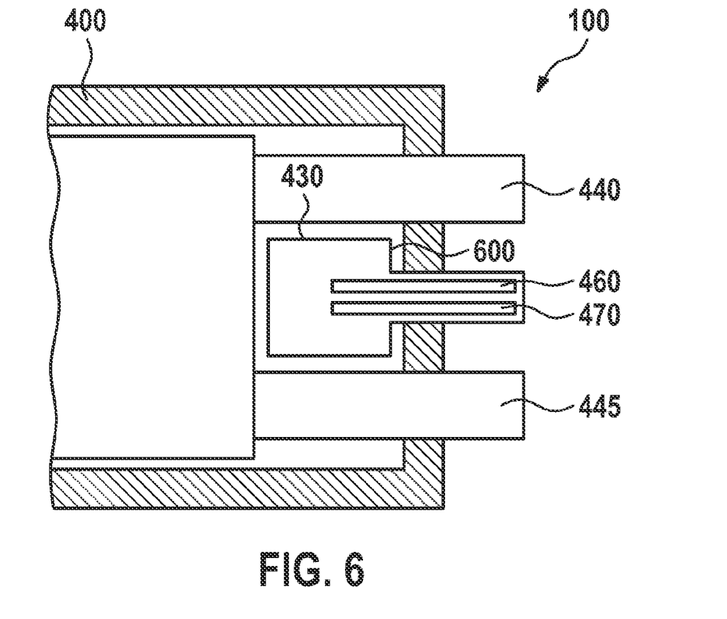
FIG. 6 shows a schematic view of a section of an electrochemical store having an encasing film according to another exemplary embodiment of the present invention.
Figure 7:
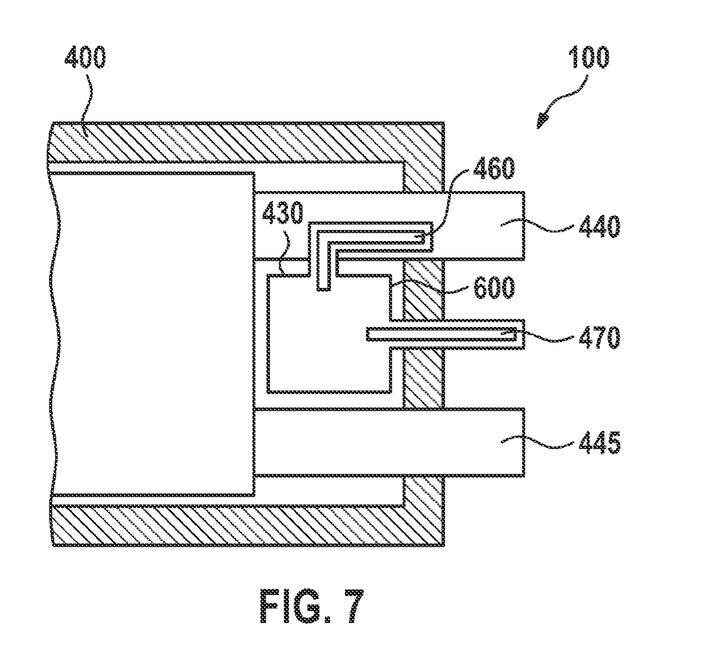
FIG. 7 shows a schematic view of a section of an electrochemical store having an encasing film according to another exemplary embodiment of the present invention.

FIGS. 6 and 7 show detailed views to illustrate possible contacting variants of the film sensors on the basis of the example of force sensor 430, which is designed here as an integrated gas pressure sensor. The views again show a cross section on external encasing 400 of pouch cell 100. In both figures, force sensor or gas pressure sensor 430 is embodied having a separate introduced carrier film 600. Film 600 is flexible and therefore does not obstruct expansion of a strain gauge used in force sensor 460. As is apparent from the views in FIGS. 6 and 7, flexible carrier film 600 completely covers or encloses sensor 430. Alternatively, a MEMS sensor element (MEMS=micro-electromechanical system) may be applied to carrier film 600 for the expansion detection.

FIG. 6 shows an exemplary embodiment of electrochemical store 100 having film-applied gas pressure sensor 230, in which first terminal 460 and second terminal 470 each form independent contacts for the voltage supply of gas pressure sensor 430.

The exemplary embodiment shown in FIG. 7 differs from that shown in FIG. 6 in that first terminal 460 connects gas pressure sensor 230 to cathode 440 here.

Figure 8A:
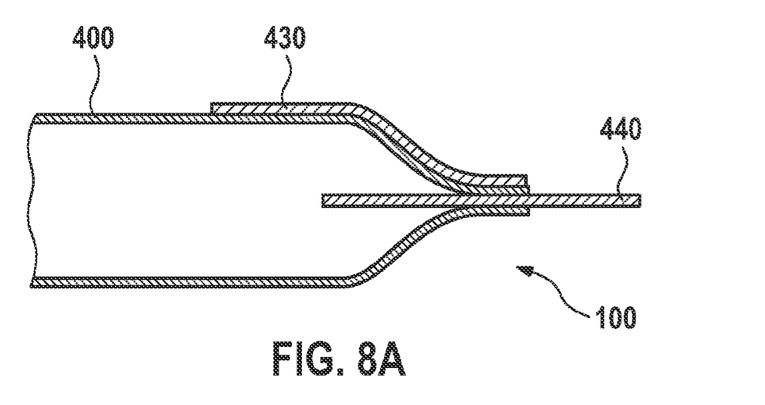
FIGS. 8A-8C show schematic views of different contacting possibilities of a force sensor of an electrochemical store having an encasing film, according to exemplary embodiments of the present invention.
Figure 8B:
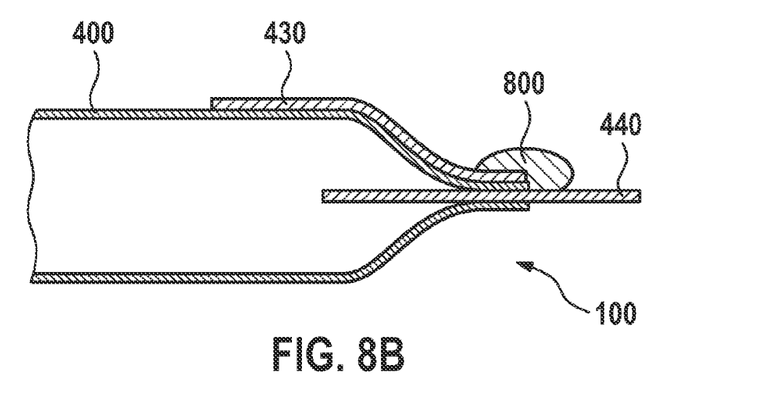
Figure 8C:
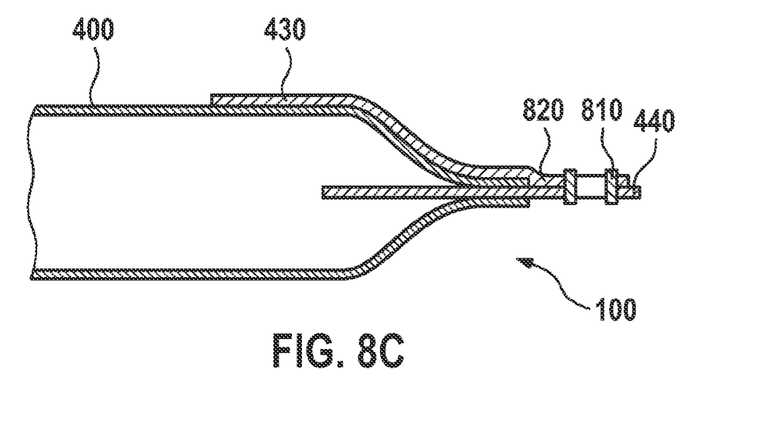

FIGS. 8A through 8C show schematic views of various contacting possibilities of a force sensor of an electrochemical store having an encasing film. In each case, the section of electrochemical store 100 already shown in FIGS. 4B through 7 is shown in a cross-sectional view, tilted by 90°. As an example, a contacting of force sensor 430 with cathode 440 is examined here. Force sensor 430 is always situated on an outer side of encasing 400 in the exemplary embodiments shown in FIGS. 8A through 8C.

FIG. 8A shows a starting situation before electrical contacting of force sensor 430. The challenge in this case is establishing a reliable electrical contact between an electrical terminal of force sensor 430 and electrode 440.

FIG. 8B shows an establishment of the contact via a conductive adhesive connection 800. Conductive adhesive connection 800 establishes an electrically conductive connection between an electrical terminal of force sensor 430 and electrode 440.

FIG. 8C shows an establishment of the contact via a type of stamped contact or through contact 810. A glued-on auxiliary film 820 is used for the bridging here. If the contacting is established in the area of a weld seam of encasing film 400, auxiliary film 820 may also be omitted. Alternatively, thick-film pastes, bond wires, and bond strips may also be used instead of auxiliary film 820.

Figure 9:
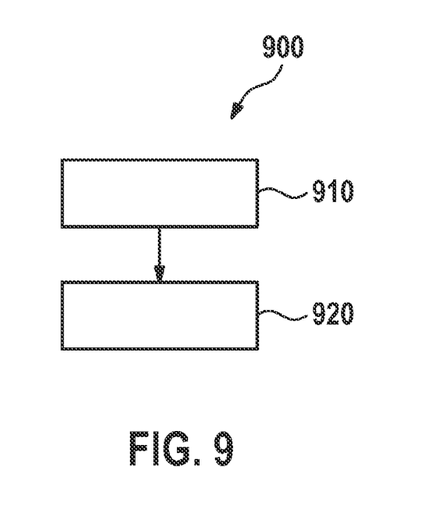
FIG. 9 shows a flow chart of a method for determining a state variable of an electrochemical store, according to one exemplary embodiment of the present invention.

FIG. 9 shows an exemplary embodiment of a flow chart of a method 900 for determining at least one state variable of an electrochemical store. The method is used in an electrochemical store, which was explained on the basis of the preceding figures, which has a galvanic element enclosed by an encasing film. In a first step 910, an expansion state of the encasing film is detected. The expansion state of the encasing film may be detected at different positions of the encasing film, for example, in a middle area and in an edge area—simultaneously or offset in time—to be able to detect different state variables of the electrochemical store. Based on the expansion state, in a following step 920, at least one state variable of the electrochemical store may be ascertained. Using a state variable, which was ascertained based on the measurement in the middle area of the encasing film, a state of charge of the electrochemical store may accordingly be inferred, while a state variable, which was ascertained based on the measurement in the edge area of the encasing film, would give indications of a state of aging or state of health of the electrochemical store.

Method 900 is designed in such a way that the fact is taken into consideration that the pressures and forces mutually influence one another inside a pouch cell stack. Method 900 also delivers informative measured values when the film sensors used are powered via the cell voltage. Method 900 may include the signal communication preferably taking place via the power line, both contacts of the sensors or integrated analysis electronics then being connected to the cell poles. According to other exemplary embodiments, method 900 is conceived in such a way that the state monitoring (exceeding of critical reference values) relays a warning signal to the battery management system via an analysis unit (ASIC), or a periodic equalization of the internal pressure sensor or gas pressure sensor with the external pressure takes place. Method 900 may also include a detected loss of the hermetic seal or a critical state of health being communicated to the central vehicle control unit and/or the driver, for example, via a warning light, or decoupling or bypassing of the damaged cell taking place in the event of a critical detected loss of the hermetic seal or a critical state of health. Furthermore, one embodiment shows the use of measured values of a (low-pressure) external pressure sensor for comparison to the measured values of the pouch cell sensor or internal gas pressure sensors by the equalization function. In another exemplary embodiment, the equalization is performed as a follow-up, for example, during the base state of the battery. In another embodiment, a characteristic diagram is used to calculate the measured values, which contains at least one empiric data value obtained from measurement trips, for example, so that an exemplar-specific equalization of the system pouch cell—film sensor may be carried out. Alternatively, the gas pressure sensor may be omitted and the state of health or gas pressure may be calculated via averaging over charging or discharging cycles.

Method 900 may be used independently of whether sensor films are situated in or on pouch cells, and enables a use of the film sensor for monitoring mechanical tensions, before a crack of the external encasing occurs as a result of resulting stresses. Correspondingly, a minimization of the safety risk may be achieved. More rapid charging and discharging of the battery cells, which may be monitored, may also be implemented because of the detection of the pressure conditions.

The exemplary embodiments which are described and shown in the figures are only selected as examples. Different exemplary embodiments may be combined with one another in their entirety or with regard to individual features. One exemplary embodiment may also be supplemented by features of another exemplary embodiment. Furthermore, method steps according to the present invention may be carried out repeatedly and in a sequence other than that described.

What is claimed is:

1. An encasing film system for a galvanic element, comprising:
    an encasing film;
    at least one force sensor positioned in a middle area of the encasing film, either within the encasing film or on a surface of the encasing film, for detecting an expansion state of the encasing film; and
    a further force sensor positioned in an edge area of the encasing film,
    wherein the edge area is a feedthrough area for at least one electrical contact of the galvanic element such that the at least one electrical contact extends beyond an edge of the encasing film.

2. The encasing film system as recited in claim 1, wherein the at least one force sensor has a strain gauge.

3. The encasing film system as recited in claim 2, wherein the at least one force sensor is situated on the surface of the encasing film.

4. The encasing film system as recited in claim 3, wherein the at least one force sensor is situated on an inner side of the surface of the encasing film.

5. The encasing film system as recited in claim 2, wherein the encasing film has an intended breakpoint, and wherein an electrical contact for an electrical connection of the at least one force sensor or the further force sensor is situated in an area of the intended breakpoint.

6. An electrochemical store for converting chemical energy into electrical energy, comprising:
    a galvanic element; and
    an encasing film which encloses the galvanic element,
    wherein the encasing film has at least one force sensor positioned in a middle area of the encasing film, either within the encasing film or on a surface of the encasing film, for detecting an expansion state of the encasing film,
    wherein the encasing film has a further force sensor positioned in an edge area of the encasing film, wherein the edge area is a feedthrough area for at least one electrical contract of the galvanic element such that the at least one electrical contract extends beyond an edge of the encasing film, and
    wherein the expansion state of the encasing film represents a state variable of the galvanic element.

7. The electrochemical store as recited in claim 6, wherein an electrical contact of the galvanic element is electrically conductively connected to an electrical terminal of the at least one force sensor.

8. The electrochemical store as recited in claim 7, further comprising:
    at least one further sensor configured as at least one of a temperature sensor, a pH value sensor, and a half-cell voltage measurement sensor, wherein a further electrical contact of the galvanic element is electrically conductively connected to an electrical terminal of the at least one further sensor.

9. An electrochemical storage system for converting chemical energy into electrical energy, comprising:
    multiple electrochemical stores which are situated in the form of a stack, each electrochemical store including at least one contact for electrical connection of the electrochemical store, a galvanic element and an encasing film which encloses the galvanic element, wherein the encasing film has at least one force sensor positioned either one of within the encasing film or on a surface of the encasing film for detecting an expansion state of the encasing film, and wherein the expansion state of the encasing film represents a state variable of the galvanic element; and
    a frame unit comprised of multiple frame elements for fixing a position of each of the electrochemical stores in the stack,
    wherein each electrochemical store is positioned and enclosed between two frame elements so that only the at least one contact for electrical connection for each electrochemical store extends beyond an upper edge of the frame unit.

10. A method for determining a state variable of an electrochemical store for converting chemical energy into electrical energy, wherein the electrochemical store has a galvanic element enclosed by an encasing film, wherein the encasing film includes at least one force sensor positioned in a middle area of the encasing film and a further force sensor positioned in an edge area of the encasing film, the method comprising:
    detecting a first expansion state in the middle area of the encasing film;
    detecting a second expansion state in the edge area of the encasing film;
    ascertaining a first state variable of the electrochemical store based on the first expansion state; and
    ascertaining a second state variable of the electrochemical store based on the second expansion state, wherein the first state variable represents a state of charge of the electrochemical store and the second state variable represents a state of aging of the electrochemical store.

* * * * *